Dec. 5, 1950  A. K. STEVENS  2,533,151
ANTISKID DEVICE
Filed Dec. 5, 1947
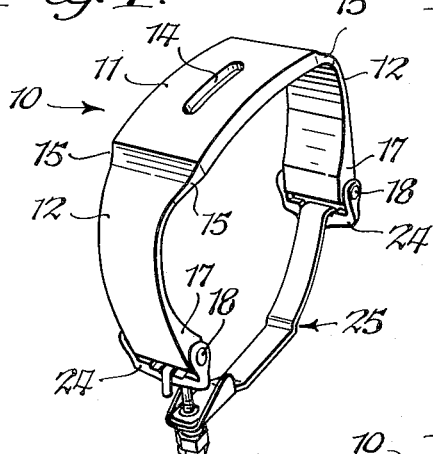
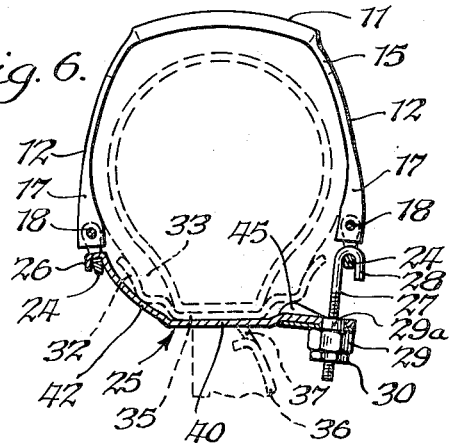
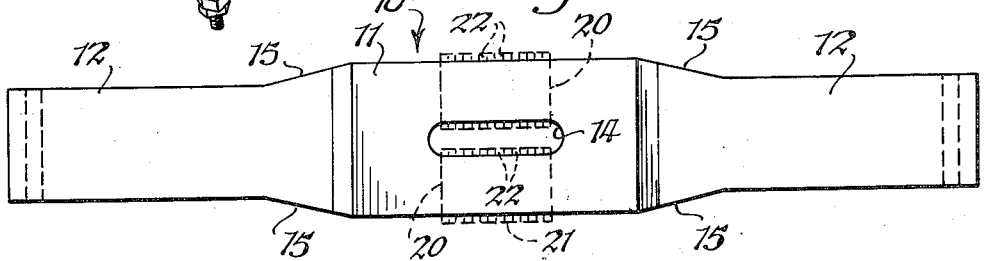
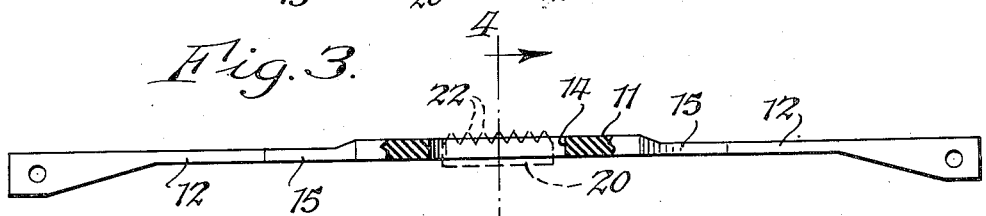
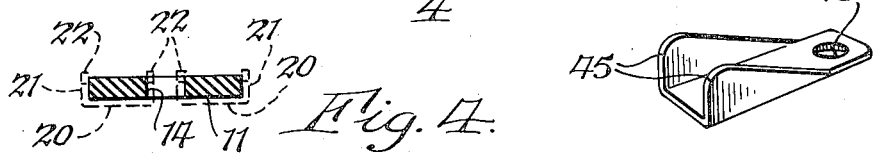
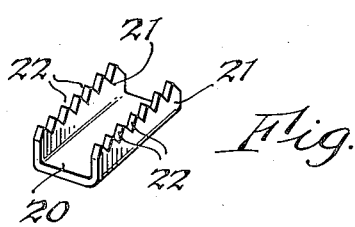
INVENTOR.
Adolph K. Stevens,
BY
Parker, Prochnow & Farmer,
Attorneys.

Patented Dec. 5, 1950

2,533,151

UNITED STATES PATENT OFFICE 2,533,151

ANTISKID DEVICE

Adolph K. Stevens, Buffalo, N. Y.

Application December 5, 1947, Serial No. 789,875

7 Claims. (Cl. 152—222)

This invention relates to improvements in antiskid devices of the type which may be readily applied to vehicle wheels to prevent slipping or skidding of the same.

One of the objects of this invention is to provide an anti-skid device of this type of improved and simplified construction which may be readily applied to a vehicle wheel and which is durable and resilient so that it may be retained on a wheel for long periods of time without appreciable wear. Another object of this invention is to provide a device of this type with a tread of improved construction to prevent slipping or skidding of a wheel. A further object is to provide a device of this type which is provided with attachments which may be applied thereto when extremely slippery or icy conditions are encountered. Another object of this invention is to provide an anti-skid device of this type with means of improved construction for readily attaching the device to a vehicle wheel, and for holding it in correct relation to the wheel. Other objects and advantages of this invention will appear from the following description and claims.

In the accompanying drawings:

Fig. 1 is a perspective view of an anti-skid device embodying this invention.

Fig. 2 is a plan view showing a part of the device laid flat.

Fig. 3 is an edge view thereof, partly in section.

Fig. 4 is a transverse sectional elevation thereof, on line 4—4, Fig. 3.

Fig. 5 is a perspective view of an ice gripping attachment of my improved anti-skid device, the attachment being shown detached from the anti-skid device.

Fig. 6 is an edge view of the anti-skid device showing the same applied to a vehicle wheel.

Fig. 7 is a perspective view showing a part of the attaching device for holding the anti-skid device in correct relation to a wheel.

My improved anti-skid device comprises a band or strip of flexible material formed to extend transversely across a tire, and in the particular construction illustrated by way of example, this band or strip 10 is preferably made of rubber, synthetic rubber, or other flexible material, such as the material of which tires are commonly made, and the strip may include fabric reinforcement (not shown), such as commonly used in tires. This strip includes a middle or tread portion 11 and side portions 12 which are formed integral with the tread portion, and which extend along the opposite side walls of the tire. The tread portion is intended to overlie a portion of the tread of the tire and is preferably made of greater thickness than the side portions for the purpose of better enabling the tread portion to resist wear to which it is subjected during the driving of the vehicle and to provide greater traction due to the increased depth of the edges of the tread portion, which provides greater shoulders to bear against snow, mud, sand or surfaces on which sufficient traction cannot be obtained by means of the tires alone. Preferably the tread portion is also made wider than the side portions 12.

The tread portion of the strip or band is provided with a slot 14 which extends lengthwise of the tread portion, and which when the anti-skid device is applied to a tire will extend crosswise of the tread of the tire. This slot increases materially the resistance of the anti-skid device to slipping or skidding, since the tread portions at the edges of the slot form shoulders which engage against snow, mud or the like in the same manner as the edges of the tread portion 11. Furthermore, the material of the tread portion at the ends of the slot form shoulders which engage snow, mud or the like to resist skidding or sidewise movement of the tire over the surface on which the vehicle is supported. The sidewise slipping or skidding of the vehicle wheel is also resisted by means of inclined edge portions 15 which connect the tread 11 with the sides 12. When the vehicle is in snow or mud, these converging edge portions 15 act to a certain extent as wedges or angular abutments which resist sidewise movement of the wheel in snow or mud.

The construction of the tread portion of the anti-skid device as described with the slot 14 therein lends itself to the application of metallic ice-gripping devices to the tread portion of the anti-skid device, and preferably I construct these ice-gripping devices in such a manner that they may be readily applied to the anti-skid devices when the same are on a vehicle wheel and so that the ice-gripping devices, when not needed may be readily removed from the anti-skid device. Anti-skid devices as herein described are intended to be applied tightly around a vehicle wheel and tire, and consequently, the ice-gripping devices are provided with parts which may be gripped or pinched between the tread of the tire and the tread of the anti-skid device for holding the ice-gripping devices securely in place, and these ice grippers are also provided with edges which extend slightly beyond the outer surface of the tread of the anti-skid device. Ice grippers of any suitable type embodying these features may be employed, and in the construction shown by way of example, see particularly Figs. 2 to 5, I have provided ice grippers of substantially U-shape or channel form, each including a portion or base 20 which is to be located between the tread of the anti-skid device and the tread of the tire, and flanges or outwardly extending projections 21 which extend outwardly beyond the outer surface of the tread of the anti-skid device. These flanges may be toothed or serrated as indicated at 22, and the flanges 21 are spaced apart to such an extent that the ice gripper may be applied to the tread portion of the anti-skid device by passing one flange through the slot 14 and the other device along a side edge of the tread portion. The width of the parts of the tread between the edges of the slot 14 and the adjacent side edges of the anti-skid device is preferably made slightly greater than the distance between the inner faces of the flanges 21 of the ice gripper so that the portion of the tread which fits between the flanges 21 of the ice gripper is slightly compressed. Consequently, when the ice grippers 20 are applied to the tread of the anti-skid device, they will be yieldingly held in place thereon.

In the use of the anti-skid device thus far described, these devices when made of a composition similar to that used in the manufacture of tires are very durable and resistant to wear so that these anti-skid devices may be applied to the tires of an automobile at the beginning of the winter season and left on the car until the end of such season. Under all ordinary conditions, such as snow, slush, or mud, the anti-skid devices without the ice grippers provide suitable traction and prevent skidding. However, if a very smooth icy surface is encountered, then it is advisable to apply the ice grippers to the anti-skid devices. This can readily be done by slightly loosening the means used for fastening the anti-skid devices to a tire and positioning the ice grippers on the tread portions of the anti-skid devices so that the parts 20 will be located between the tread portions of the anti-skid device and the tire, and so that one flange 21 extends through the slot 14 and the other flange bears against an edge of the anti-skid device. Two ice grippers are shown in Figs. 2 and 4 as applied to the anti-skid device, but if desired, only one ice gripper may be thus applied. After the anti-skid device is again drawn tightly around the tire, the ice grippers will be securely held against accidental removal during the use of the vehicle. By means of this construction, it is also possible to provide users of anti-skid devices of this type with more ice grippers than required for the anti-skid devices used, so that when the ice engaging edges of the ice grippers are worn down, they can be easily and inexpensively replaced by other ice grippers.

The anti-skid device described may be applied to a vehicle wheel in any suitable or desired manner. For example, the anti-skid devices described may be used in connection with securing means such as disclosed in my Patent No. 2,422,595 of June 17, 1947, or if desired, the anti-skid devices may be individually secured to a vehicle wheel. For this purpose, the free ends of the side portions 12 may be formed to be connected with suitable means for holding the strips on a wheel, and for this purpose in the construction shown, these ends of the bands or strips are of increased thickness as indicated at 17, and are provided with suitable apertures to receive parts of any suitable fastening devices, such for example as those shown in said patent, or individual fastening devices for each strip or band.

In the construction shown by way of example in Figs. 1, 6 and 7, individual attaching devices are provided for securing individual anti-skid devices to vehicle wheels. In this construction shown, the pins 18 forming parts of clevices or loops 24, extend through the holes in the enlarged ends of the side portion 12. The attaching device includes a rigid metal strap-like member or bar 25 having one end formed into a hook 26 which may engage the clevis 24 at the end of one of the sides 12 of the anti-skid device. The other end of the metal securing bar 25 is provided with an aperture through which a bolt 27 may extend, which bolt has a hook 28 formed at one end thereof to engage a clevis 24. A nut 29 may be employed to draw the bolt through the hole in the metal bar 25 for tightening the anti-skid strip or band 10 on the tire, and a lock nut 30 may be used to prevent loosening of the holding nut 29.

The fastening device for the anti-skid member is constructed for cooperation with vehicle wheels of the type now commonly employed, a cross section of which is shown in broken lines in Fig. 6. Wheels of this type include a rim having side flanges 32 between which the beaded portions 33 of a tire fit and wheel rims of this type are also provided midway between the flanges thereof with grooves or depressions into which the bead portions of the tire may enter during the applications of the tires to or the removal of the tires from the wheel. This channel 35 forms substantially a wheel felly and the disk portion 36 of the wheel is welded or otherwise suitably secured to the felly 35. At intervals the wheel disk is provided with slots 37 adjacent to the felly through which the fastening members of anti-skid devices may be passed. In order to cooperate with these narrow slots in the wheel disk 36 immediately adjoining the felly 35, it is necessary to provide the bar 25 of the metal fastening member with a substantially straight portion 40 which can readily be passed through the relatively narrow slot 37.

It is also desirable to provide means associated with the fastening device for preventing the same from slipping through the slot 37 when the anti-skid device is in use, so that the tread portion 11 of the anti-skid device will always remain in correct relation to the tread of the tire. In order to prevent dislodgement of the fastening member and resulting dislodgement of the anti-skid device, I have provided the fastening member 25 with an inclined portion 42 which may bear against one side of the felly 35, and thus prevent the dislodgement of the anti-skid device in one direction. In order to prevent dislodgement of the fastening member and anti-skid device in the other direction, I have provided a removable part on the straight portion 40 of the fastening device, which may engage the other side of the felly and which, in the construction shown, see particularly Figs. 1, 6 and 7, is in the form of an abutment member of substantially U or channel shape, in which the two flanges 45 of the channel are spaced apart sufficient to enable this part to straddle the metal bar 40. This abutment member is provided with a hole 46 therein through which the bolt 27 may pass for securing this abutment member to the metal bar 40. The ends of the flanges 45 form shoulders which are adapted to bear against the adjacent side of the felly to restrict the movement of the fastening device relatively to the felly, and consequently, keep the anti-skid device in such relation to the tire that the tread portion thereof will substantially coincide with the tread of the tire.

The anti-skid device may be easily applied to a tire by inserting the bar 25 through a slot 37 of the wheel and applying the flexible part of the anti-skid device about the tire and hooking one end of the bar 25 to one of the clevises 24. The hook bolt is then engaged with the other clevis and passed through the hole in the bar 25, whereupon the abutment member is applied so that this member straddles the bar 25 and the bolt 27 extends through the hole 46. The nut 29 has a cylindrical extension 29a which enters the hole 46 and the hole in the bar 25, and this nut is then applied to the bolt and tightened so that the anti-skid device is securely fastened to the wheel, whereupon the lock nut 30 may be applied. The device without the ice grippers may be used under ordinary conditions of snow, sand and mud. Since the material of which the flexible part of the anti-skid device and the tread 11 thereof is made is of a very durable nature, and since the tread 11 is of itself flexible and relatively thin, the presence of the anti-skid devices on the wheels is hardly perceptible even when driving a vehicle on hard surfaced roads, so that the anti-skid device may be kept on the wheels throughout the winter. The device will prevent skidding under ordinary slippery conditions and will provide ample traction to enable the car to be driven through deep snow, mud, sand and under other conditions in which satisfactory traction cannot be obtained without anti-skid devices. If smooth ice or other very slippery surface is encountered, the ice grippers may be applied by loosening the nuts on the bolt 27 sufficiently to permit the ice grippers to be inserted between the tire tread and the tread of the anti-skid device. When these ice grippers have been positioned as shown in Figs. 2, 3, and 4, the nut 29 may again be tightened, whereupon the ice grippers will be securely locked in place. By means of these ice grippers, traction may be obtained on extremely slippery surface and skidding or side slipping is prevented. When the serrated edges of the ice grippers become worn down so that the same lose their efficiency, they can readily be replaced by other ice grippers, and since these grippers are inexpensive and small, an ample supply of the same can conveniently be carried in the vehicle for use in case of need.

By making the ends of side members 12 relatively thick as shown at 17, the clevises will be kept out of contact with the side walls of the tire and wheel rim, so that wear of these parts is avoided.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. An anti-skid device for use with a vehicle tire mounted on a wheelrim, including a strip of flexible material adapted to extend transversely across the tread of a tire, said strip comprising a tread portion and side portions extending from said tread portion along the side walls of the tire, said tread portion having a slot formed therein extending lengthwise of said strip through the same and crosswise of a tire when said anti-skid device is secured thereto, a metal member having a portion held in place between said strip and said tire, and a portion extending along an edge of said strip beyond the tread portion thereof for gripping a slippery pavement, and means engaging the ends of said side portions of said strip to hold the same on the tire.

2. An anti-skid device for use with a vehicle tire mounted on a wheelrim, including a strip of flexible material adapted to extend transversely across the tread of a tire, said strip comprising a tread portion and side portions extending from said tread portion along the side walls of the tire, said tread portion having a slot formed therein extending lengthwise of said strip and through the same and crosswise of a tire when said anti-skid device is secured thereto, a metal member having a portion held in place between said strip and said tire and a portion extending through said slot to grip a slippery pavement, and means engaging the ends of said side portions of said strip to hold the same on the tire.

3. An anti-skid device for use with a vehicle tire mounted on a wheelrim, including a strip of flexible material adapted to extend transversely across the tread of a tire, said strip comprising a tread portion and side portions extending from said tread portion along the side walls of the tire, said tread portion having a slot formed therein extending lengthwise of said strip and through the same and crosswise of a tire when said anti-skid device is secured thereto, a metal ice gripping member having a part extending through said slot and having a serrated outer edge, and a part formed to lie between said strip and a tire tread for removably holding said member in operative relation to said strip, and means engaging the ends of said side portions of said strip to hold the same on the tire.

4. An anti-skid device for use with a vehicle tire mounted on a wheelrim, including a strip of flexible material adapted to extend transversely across the tread of a tire, said strip comprising a tread portion and side portions extending from said tread portion along the side walls of the tire, said tread portion having a slot formed therein extending lengthwise of said strip and crosswise of a tire when said anti-skid device is secured thereto, and a metal member of approximately U-shape and including a base part formed to lie between said strip and a tire and a pair of flanges extending outwardly, one of said flanges extending through said slot and the other flange extending along a side edge of said strip, the outer edges of said flanges extending beyond the outer surface of said strip to engage the surface over which the tire is travelling, said U-shaped member being held against movement out of its operative position when said strip is secured tightly to a tire and being removable when said strip is loosened, and means engaging the ends of said side portions of said strip to hold the same on the tire.

5. An anti-skid device according to claim 4, characterized in that the outer edges of said flanges of said U-shaped member are serrated.

6. An anti-skid device for use with a vehicle tire mounted on a wheel rim, including a strip of flexible material adapted to extend transversely crosswise over the tread of the tire, said strip comprising a tread portion and side portions extending from said tread portion along the side walls of the tire, said tread portion having a slot formed intermediate of the edges thereof, and extending lengthwise of said strip and crosswise of a tire when said anti-skid device is secured thereto, and a pair of metal ice grippers of approximately U-shape each including a base portion and flanges extending outwardly therefrom, one flange of each ice gripper extending through said slot, and the other flange extending along an edge of said strip, said base portion connecting said flanges lying between said strip and the tire and held against dislodgement by said strip when the same is secured to a tire, the outer edges of said flanges extending beyond the outer surface of the tread portion of said strip to engage the surface over which the tire is travelling, and means engaging the ends of said side portions to hold said anti-skid device on a tire.

7. An anti-skid device for use with a vehicle tire mounted on a wheelrim having a felly portion, said device including a flexible member extending transversely across the tread portion of the tire to prevent slipping of the tire on the surface on which the vehicle is supported, the ends of said flexible member which extend along the side walls of the tire having clevises secured thereto, an attaching device for securing said flexible member in operative relation to the tire and including a substantially rigid bar having a substantially straight portion terminating at one end thereof in a portion inclined outwardly with reference to the wheel and having a hook formed in the end thereof which is adapted to engage a clevis at one end of said flexible member, said inclined portion engaging one side of said felly to prevent said attaching device from sliding in one direction, a threaded bolt having a hook formed on one end thereof for engagement with the other clevis, said straight portion of said bar having a hole formed therein through which said bolt may extend, a nut for engagement with said bolt and said bar for drawing said anti-skid device into tight engagement with a tire, and an abutment device of substantially channel form which straddles said bar and which has a shouldered portion adapted to engage the other side of said felly to prevent said attaching device from sliding in the opposite direction, said abutment device being readily removable from said bar when said attaching device is removed from the tire and having a hole therein through which said bolt may pass for securing said abutment device to said bar.

ADOLPH K. STEVENS.

REFERENCES CITED

The following references are of record in the file of this patent:

UNITED STATES PATENTS

| Number | Name | Date |
| --- | --- | --- |
| 923,456 | Stevenson | June 1, 1909 |

FOREIGN PATENTS

| Number | Country | Date |
| --- | --- | --- |
| 153,662 | Switzerland | Mar. 31, 1932 |
| 148,210 | Austria | Dec. 28, 1936 |
| 470,076 | Great Britain | Aug. 9, 1937 |